(12) United States Patent
Fitzpatrick et al.

(10) Patent No.: US 7,266,583 B2
(45) Date of Patent: Sep. 4, 2007

(54) METHOD AND SYSTEM FOR PROVIDING CONTACT MANAGEMENT TO CHAT SESSION PARTICIPANTS

(75) Inventors: Gregory P. Fitzpatrick, Keller, TX (US); Frederick Yung-Fung Wu, Greenwich, CT (US)

(73) Assignee: International Business Machines Corporation, Armonk, NY (US)

( * ) Notice: Subject to any disclaimer, the term of this patent is extended or adjusted under 35 U.S.C. 154(b) by 672 days.

(21) Appl. No.: 09/933,332

(22) Filed: Aug. 20, 2001

(65) Prior Publication Data

US 2003/0037112 A1    Feb. 20, 2003

(51) Int. Cl.
G06F 15/16    (2006.01)

(52) U.S. Cl. .................. 709/205; 709/204; 709/206; 709/207

(58) Field of Classification Search ................ 709/227, 709/206, 245, 246, 205, 204, 207
See application file for complete search history.

(56) References Cited

U.S. PATENT DOCUMENTS

| | | | |
|---|---|---|---|
| 6,393,412 B1* | 5/2002 | Deep | 705/400 |
| 6,487,583 B1* | 11/2002 | Harvey et al. | 709/204 |
| 6,564,261 B1* | 5/2003 | Gudjonsson et al. | 709/227 |
| 6,993,564 B2* | 1/2006 | Whitten, II | 709/207 |
| 7,080,139 B1* | 7/2006 | Briggs et al. | 709/224 |
| 2002/0023132 A1* | 2/2002 | Tornabene et al. | 709/205 |
| 2002/0029244 A1* | 3/2002 | Suzuki et al. | 709/203 |
| 2002/0120760 A1* | 8/2002 | Kimchi et al. | 709/230 |
| 2002/0198008 A1* | 12/2002 | Smith et al. | 455/466 |
| 2003/0023508 A1* | 1/2003 | Deep | 705/26 |
| 2003/0028600 A1* | 2/2003 | Parker | 709/206 |
| 2003/0126250 A1* | 7/2003 | Jhanji | 709/223 |

OTHER PUBLICATIONS

U.S. Appl. No. 09/919,391, filed Aug. 2, 2001, Fitzpatrick, et al.

* cited by examiner

Primary Examiner—David Wiley
Assistant Examiner—Asghar Bilgrami
(74) Attorney, Agent, or Firm—Akerman Senterfitt

(57) ABSTRACT

The present invention provides a method and system for providing contact management to participants engaged in a communication session. The invention permits chat session participants to a communication session to determine common contacts that exists between the chat session participants. Dependent on the accessibility of the particular chat session participants' contact list, other chat session participants to the communication session can view the information located in the contact list. Moreover, a particular chat session participant to the communication session can give either a particular chat session participant or all the chat session participants to the communication session permission to modify their contact list. Permission to access or modify contact lists for chat session participants can be defined prior to establishment of the communication session and/or changed during the communication session. Changes relating to whether a particular contact list is accessible and/or modifiable can be initiated by the chat session participant associated with the contact list. Additionally, such changes can be initiated by a request from a chat session participants to modify the contact records in a particular contact list. The invention can be applicable to systems which can include, but is not limited to, chat rooms, instant messaging, and call conferencing.

55 Claims, 2 Drawing Sheets

METHOD AND SYSTEM FOR PROVIDING CONTACT MANAGEMENT TO CHAT SESSION PARTICIPANTS

BACKGROUND OF THE INVENTION

1. Technical Field

The present invention relates to the field of remote multiuser group communication and messaging and more particularly, to a method and system for managing contact information for participants engaged in a chat session.

2. Description of the Related Art

The Internet and Intranets provide a medium for bringing together users that have a common interest. Internet and Intranet chat sessions typically provide such a medium. Chat sessions can be hosted by a server which runs the chat application. A participant in a chat session typically can access the chat session using a browser or a specialized chat session software referred to as a "chat client." In the case of a browser, the browser can facilitate the client by invoking the chat client.

Chat sessions have progressed from supporting single line text interface similar to the well known Internet Relay Chat (IRC), to supporting sophisticated graphical user interface (GUI) chat clients. These GUI-based chat client can process still images, realtime images, audio data, text data and information about a particular user. User information typically is stored in a file called a user profile. The information contained in a user profile can include personal information, such as name, age, address, and place of birth. General information about a user can also be stored in the user profile. For example, general information can include special interest such as hobbies, sports and activities. Where a user is related to a business, business related information such as suppliers, manufacturers and retailers can also be stored in the user profile.

During a chat session, in addition to seeing the text typed by a user or the audio spoken by a user, profile information can be acquired for a particular user by, for example, selecting a corresponding user identifier from a list of user identifiers presented in the chat session client and viewing the selected user profile. Still, although chat sessions provide a medium for multiuser communication, they lack the ability to effectively manage contact information for users.

SUMMARY OF THE INVENTION

The invention provides a method and apparatus for providing contact management for participants engaged in a chat session. Participants engaged in the chat session can each have a contact list. Notably, a first chat session participant can have a first contact list and a second chat session participant can have a second contact list. Access to the first contact list can be provided to the second chat session participant. Similarly, access to the second contact list can be provided to the first chat session participant. A determination can be made as to whether the first contact list can be modified by the second chat session participant. If the first contact list is modifiable by the second chat session participant, the second chat session participant can be permitted to modify the first contact list. This modification can include, but is not limited to, the addition of contact information to the first contact list.

An icon can be displayed to indicate whether the first contact list is accessible. By altering the displayed icon, the displayed icon can be further utilized to indicate whether the first contact list can also be modified. A second icon can be displayed to indicate whether the second contact list is accessible. By altering the displayed icon, the displayed icon can be further utilized to indicate whether the second contact list can also be modified.

A third chat session participant can be permitted to select any of the icons representing the first and the second contact list. This third chat session participant can also have a third contact list and an icon can be used to indicate whether the third contact list is accessible and/or modifiable. By selecting the first and second contact list icons, a comparison can be made between the first, second, and third contact lists. The results of the comparison can include a display of dissimilar contacts that exist between the first, the second and the third contact lists. The results of the comparison can also include a display of similar contacts that exist between the first, the second and the third contact lists.

The method can further include the steps of permitting any of the chat session participants to modify a contact list of another chat session participant. However, the chat session participant whose contact list has been modified can be permitted to reject any modification that has been made to their contact list. In the case where an icon indicates that a first contact list is not modifiable, then a second chat session participant wishing to modify the first contact list can request permission from the first chat session participant to modify the first contact list. In the case where an icon indicates that a second contact associated with the second chat participant is not modifiable, then a first chat session participant wishing to modify the second contact list can request permission from the second chat session participant to modify the second contact list.

The method for providing contact management can further include the steps of requesting the first chat session participant to provide access to the first contact list and requesting the second chat session participant to provide access to the second contact list. Furthermore, accessibility status for a particular contact list can be provided to selected chat session participants or to all chat session participants.

An alternative embodiment of the invention includes a method for providing contact management to parties engaged in a chat communication session. Each participant to the communication session can have an associated contact list. Hence, a first participant to the communication session has a first contact list and a second participant to the communication session has a second contact list. The method can include the steps of making the first contact list accessible to a second communication session participant and identifying similar and/or dissimilar contacts that exist between contact records located in the first contact list and contact records located in the second contact list. Selected dissimilar contact records located in the first contact list can be subsequently added to the second contact list.

The method can further include the step of determining if the first contact list can be modified by the second participant to the communication session. If the first contact list is modifiable by the second participant, selected dissimilar contact records can be added to the first contact list by the second participant. The step of providing access to a particular contact list can include the step of determining an accessibility status of the first contact list and providing access to the first contact list if the accessibility status indicates that the second participant is permitted to access the first contact list. A similar determination can be made as to whether the second contact list is accessible by the first participant to the communication session. If the second contact list is accessible by the first participant, similar contacts that exist between contact records located in the second contact list and contact records located in the first contact list can be identified. If the second contact list is modifiable by the first participant to the communication session, selected dissimilar contact records located in the second contact list can be added to the first contact list.

Additionally, the method can further include the step of displaying an icon to represent whether a contact list for a participant to the communication session is accessible. If the contact list is also modifiable, then the display icon can be further modified to indicate that the contact list is also modifiable.

A further embodiment of the invention includes a method for providing contact management to chat session participants. A first chat session participant can have a first associated contact list and a second chat session participant can have a second associated contact list. The method can include the steps of permitting access to the first contact list by the second chat session participant and permitting access to the second contact list by the first chat session participant. A modification status can be provided to indicate whether the first contact list is modifiable. If the modification status indicates that the first contact list is modifiable, then the addition of contact information to the first contact list is permitted. Similarly, a modification status can be provided to indicate whether the second contact list is modifiable. If the modification status indicates that the second contact list is modifiable, then the addition of contact information to the second contact list is permitted. The modification status of the first and the second contact lists can be provided to selected chat session participants or to all chat session participants.

In yet a further embodiment of the invention, a method for providing contact management in a chat session is provided. The method can include the step of sending a token of introduction from a first chat session participant to a second chat session participant. The first chat session participant can have a first contact list and the second chat session participant can have a second contact list. The token of introduction can provide a recommendation for the second chat session participant. The token of introduction can be transferred to a third chat session participant who is known to the first chat session participant. The third chat session participant can have a third contact list. If the third chat session participant accepts the token of introduction, the third contact list can be modified with contact information for the second chat session participant. The method can further include the step of modifying the second contact list with information for the third chat session participant. The token of introduction can be configured to expire after a specified period of time. The transferring step can be executed whenever the third chat session participant initiates a chat session with the second chat session participant.

The invention further provides a system for contact management. The system can include a first contact list that is associated with a first chat session participant. A second chat session participant having an associated second contact list can be engaged in a chat session with said first chat session participant. A computing application program can facilitate the chat session. The application program can permit the second chat session participant to modify the first contact list and can also permit the first chat session participant to modify the second contact list. The system can further include a computer application server for executing the computing application program. A first computing device can permit the first contact list to be viewed by the second chat session participant and a second computing device can permit the second contact list to be viewed by the first chat session participant.

In a further embodiment of the invention, a GUI for providing contact management for chat session participants is provided. The GUI can include a chat display window for displaying communication for the chat session participants, including a first chat session participant and a second chat session participant engaged in a chat session. At least one contact window can be provided for displaying contact information for at least one chat session participant engaged in the chat session. The GUI can have at least one contact window which can appear as a window pane within the chat display window. Alternately, the GUI can have at least one contact window that can be a window pane located external to the chat display window. A first modifiable status icon can be utilized for indicating whether the first contact list is accessible and if the first contact list is accessible, whether the first contact list is modifiable. A second status icon can indicate whether the second contact list is accessible and if the second contact list is accessible, whether the second contact list is modifiable.

The invention also provides a machine readable storage having stored thereon, a computer program with a plurality of code sections that can be executed by a machine for causing the machine to perform the steps associated with the foregoing methods.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE INVENTION

Figure 1:
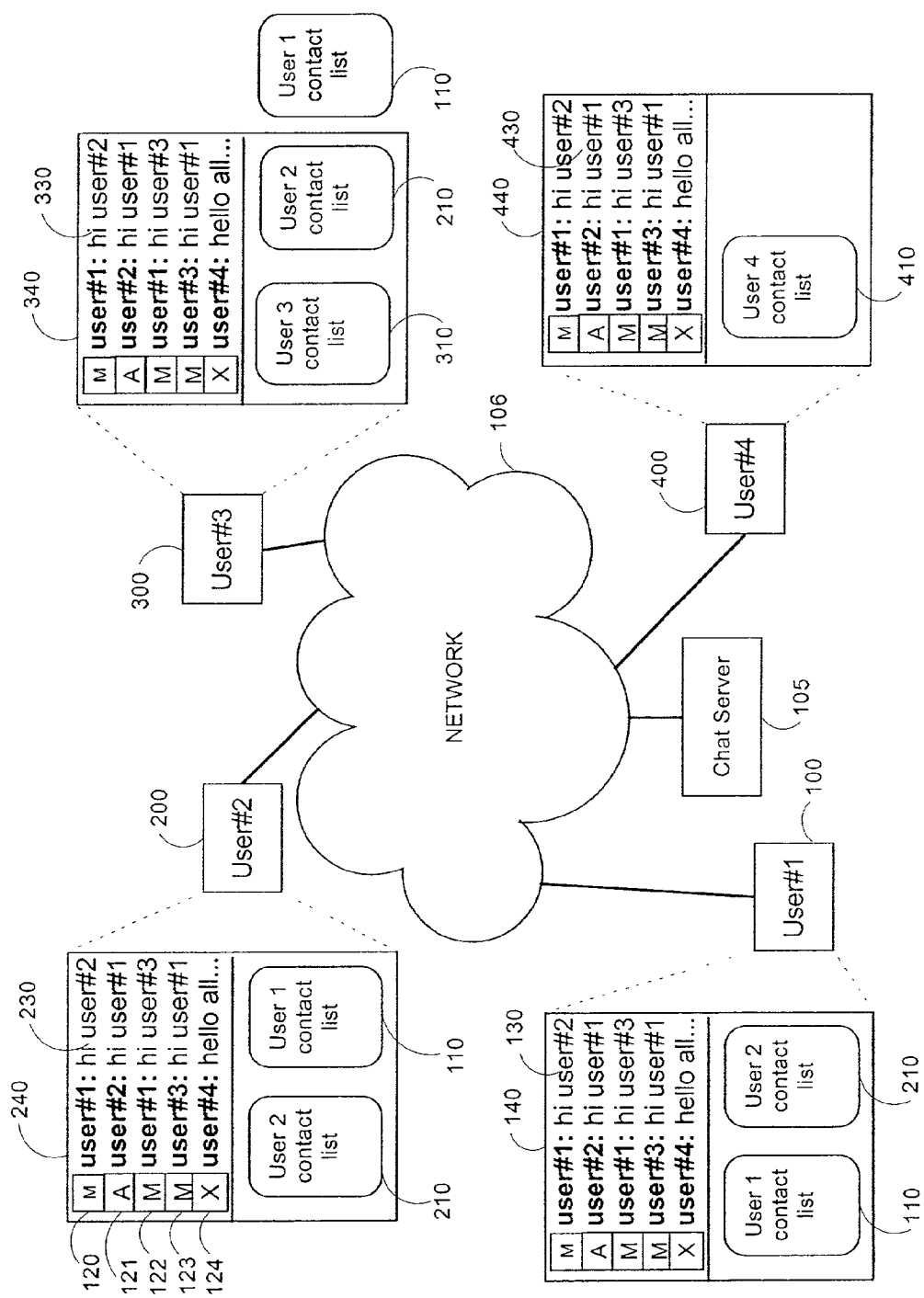
FIG. 1 is a high level block diagram of an exemplary system for providing contact management for chat session participants.

The present invention provides a method and system for providing contact management for chat session participants. Each participant engaged in a chat session can have a contact list. A contact list is a list maintained by a chat session user which can contain contact information related to friends, associates, and acquaintances. Where the chat session user is related to a business, then the contact information can contain business related information such as information about manufacturers, retailers, wholesalers and customers. For example, a first chat session participant can have a first contact list and a second chat session participant can have a second contact list. In order to share information, access to the first contact list can be provided to the second chat session participant. Similarly, access to the second contact list can be provided to the first chat session participant. Access can include the ability to view the contents of another chat session participant's contact list. A particular chat session participant can be permitted make their associated contact list inaccessible by all participants that either don't have a contact list or those chat session participants that don't make their contact list accessible.

Although individual chat session participants can view the entire contents of a particular chat session participant's contact list, the contact list can be configured so that only certain areas of the contact list are accessible by individual chat session participants. For example, a particular area of a contact list can be dedicated to the addition of contacts from other chat session participants. The chat session participant for a particular contact list can have complete autonomy to designate what areas, if any, will be accessible to a particular user.

Importantly, it should be recognized that although the contact list can be associated with an individual chat session participant, the contact list can also be associated with an entity such as a business. Although each chat session participant can have a contact list, it should be recognized that the invention in not limited in this way. At least one chat session participant having a contact list is required in order for other chat session participants to access a contact list. Moreover, at least two chat session participants having contact lists that are accessible are required in order to compare contact list records. A chat session participant can include anyone accessing the chat session. Hence, it is not necessary for a participant to be actually chatting to be a participant.

A method for providing contact management can include determining the modification status of a first contact list. The modification status can be defined as the right of chat session participants to make modifications to a particular contact list. Although a particular contact list can be accessed by other chat session participants, an individual chat session participant might not have the right to modify the contact list of another chat session participant. Hence, the modification status or rights can indicate whether the contact list can be modified by a particular chat session participant or by all the chat session participants. Returning to the previous example, if the modification status or rights indicate that the first contact list can be modified by the second chat session participant, the second chat session participant can be permitted to modify the first contact list.

Modifications to the contact list can include, but are not limited to, the addition of contact information to the contact list. The modifications to a contact list can also include adding a completely new entry, correcting an existing entry, and deleting an existing entry. Even though a chat session participant can make modifications to a particular contact list, in one aspect of the invention, the person or entity to which a contact list is associated can choose to accept or reject the modification.

In a further aspect of the invention, an icon can be displayed to indicate whether a particular contact list is accessible. The displayed icon can further indicate whether a particular contact list can also be modified. While the icon used to indicate the modification status or rights and the icon used to represent the accessibility status or rights can be the same icon, it should be readily understood that two separate icons can be utilized. Hence, a single icon can be modified to indicate both the modification and the accessibility status or rights.

A particular chat session participant can be permitted to select any of the icons representing the contact lists of other chat session participants. By selecting the icons representing the contact lists of other chat session participants, the particular chat session participant can compare the contact list of other chat session participants with that of their own. For example, a third chat session participant can be permitted to select any of the icons representing the first contact list for the first chat session participant and the second contact list for the second chat session participant. This third chat session participant can also have a third contact list and a third icon can be used to indicate whether the third contact list is accessible and/or modifiable. The third chat session participant can be permitted to select the first and second contact list icons in order to compare the contact records contained in the first, second, and third contact lists. The results of the comparison can include a display of similar and dissimilar contacts that exist between the first, the second and the third contact lists. In one aspect of the invention, the similar contacts records can be highlighted in a first color and the dissimilar contact records can be highlighted in a different color.

Any of the chat session participants can be permitted to modify a contact list of another chat session participant. However, the chat session participant for whom the contact list has been modified, can be permitted to reject any modification that has been made to their contact list. As a result, any change to a participant's contact list by another participant can be temporary. The change to the participant's contact list can be made permanent by the participant associated with the contact list accepting the change.

Where a particular contact list is not modifiable, permission can be requested to modify that particular contact list. For example, returning to the previous example, where an icon indicates that a first contact list is not modifiable, then a second chat session participant wishing to modify the first contact list can be permitted to initiate a request to grant permission from the first chat session participant to modify the first contact list. In another example, where an icon indicates that a second contact list is not modifiable, then a first chat session participant wishing to modify the second contact list can request permission from the second chat session participant to modify the first contact list.

An accessibility status can be used to indicate whether a particular contact list is accessible. The accessibility status can indicate whether a contact list can be viewed. The contact list can be configured so that all chat session participants or only selected chat session participants can view a particular contact list. Where a particular contact list is not accessible, a participant wishing to access that contact list can be permitted to request permission to access that contact list. For example, the first chat session participant can be permitted to initiate a request requiring the second chat session participant to grant permission to access the second contact list. Similarly, the second chat session participant can be permitted to initiate a request requiring the first chat session participant to grant permission to access the first contact list.

FIG. 1 is a high level block diagram of an exemplary system for providing contact management for chat session participants. Referring to FIG. 1, participants user#1 100, user#2 200, user#3 300 and user#4 400 each have contact lists 110, 210, 310 and 410 respectively. The participants 100, 200, 300 and 400 communicate via network 106. Network 106 can be, for example, an intranet or the Internet. Although a network is shown, this is not intended to limit the invention. The invention can also be applicable in instances where chat session participants communicate via a dedicated connection.

Chat session participant 100 has a display 140, with a chat display window 130, access and modification icon 120, 121, 122, 123 and 124. For clarity, the chat display windows 130, 230, 330 and 430 will be the same since there is only one chat session. Display 140 also has contact windows 110 and 210. Contact window 110 displays the contact list for chat session participant 100 and contact window 210 displays the contact list for chat session participant 200. Chat session participant 200 has a display 240, with a chat display window 230, access and modification icons 120, 121, 122, 123 and 124. Display 240 also has contact windows 210 and 110. Chat session participant 300 has a display 340, with a chat display window 330, access and modification icons 120, 121, 122, 123 and 124. Display 340 also has contact windows 210 and 310. A third contact list 110 for chat session participant 300 is viewable by chat session participant 300. Contact window 310 can be displayed outside the main or primary display window 340. The contact windows 110, 210, 310 and 410 can be secondary windows and can appear within or external to the primary chat window 140, 240, 340 and 440 respectively. Any of the contact windows 110, 210, 310 and 410 can be moved within or outside the secondary windows 140, 240, 340 and 440 respectively. Chat session participant 400 has a display 440, with a chat display window 430, access and modification icons 120, 121, 122, 123 and 124. Display 440 also has a contact window 410 which is the contact list for chat session participant 4.

Chat display window, for example, 130, can display the chat information in a window located within the display 140 which can be a GUI. Chat display windows are known in the art of multiuser communication. In a chat display window, each user's communication can be identified by an alias. For example, chat session participant 100 has user#1 as an alias, chat 200 participant has user#2 as an alias, chat session participant 300 has user#3 as an alias, and chat session participant 400 has user#4 as an alias.

Located next to each alias is an accessibility or modification icon. An icon, for example 121, can be used to identify whether a particular chat session participant's contact list is accessible. Icon 121 has an "A" appearing next to communication for chat session participant 200 having alias user#2, indicates that the contact list for chat session participant 200 is accessible. This allows other participants to view the contents of the contact list for participant 200. As a result of the accessibility status, the contact list for chat session participant 200 can be played in display 140 and 340. A particular participant can choose which participants in the chat session is able to view their contact list. For example, chat session participants 100, 200 and 300 have all prevented chat session participant 400 from viewing contact list 110, 210 and 310 respectively. As a result, chat session participant 400 cannot display contact list 110, 210 and 310. In the case where a chat session participant chooses to prevent all other participants in the chat session from accessing their contact list, an icon, for example icon 124, can be utilized to indicate this inaccessibility. Icon 124 is one such icon that utilizes an "X" to indicate inaccessibility. It should be recognized that a participants own icon within their display window can always indicate an accessible or modifiable status.

In addition to accessing a participant's contact list, a participant can be permitted to modify the contact list of another. A modification icon, for example icons 122 and 123, can be utilized to indicate this modification status. As shown in displays 140, 240, 340, 440, chat session participants 100 and 300 have identified their contact lists as being modifiable through the utilization of icons 122 and 123 respectively. Since a particular chat session participant can change the accessibility and/or modification status of their associated contact list at any time, it is preferable to have this status indicated next to the most recent communication for each chat session participant.

Figure 2:
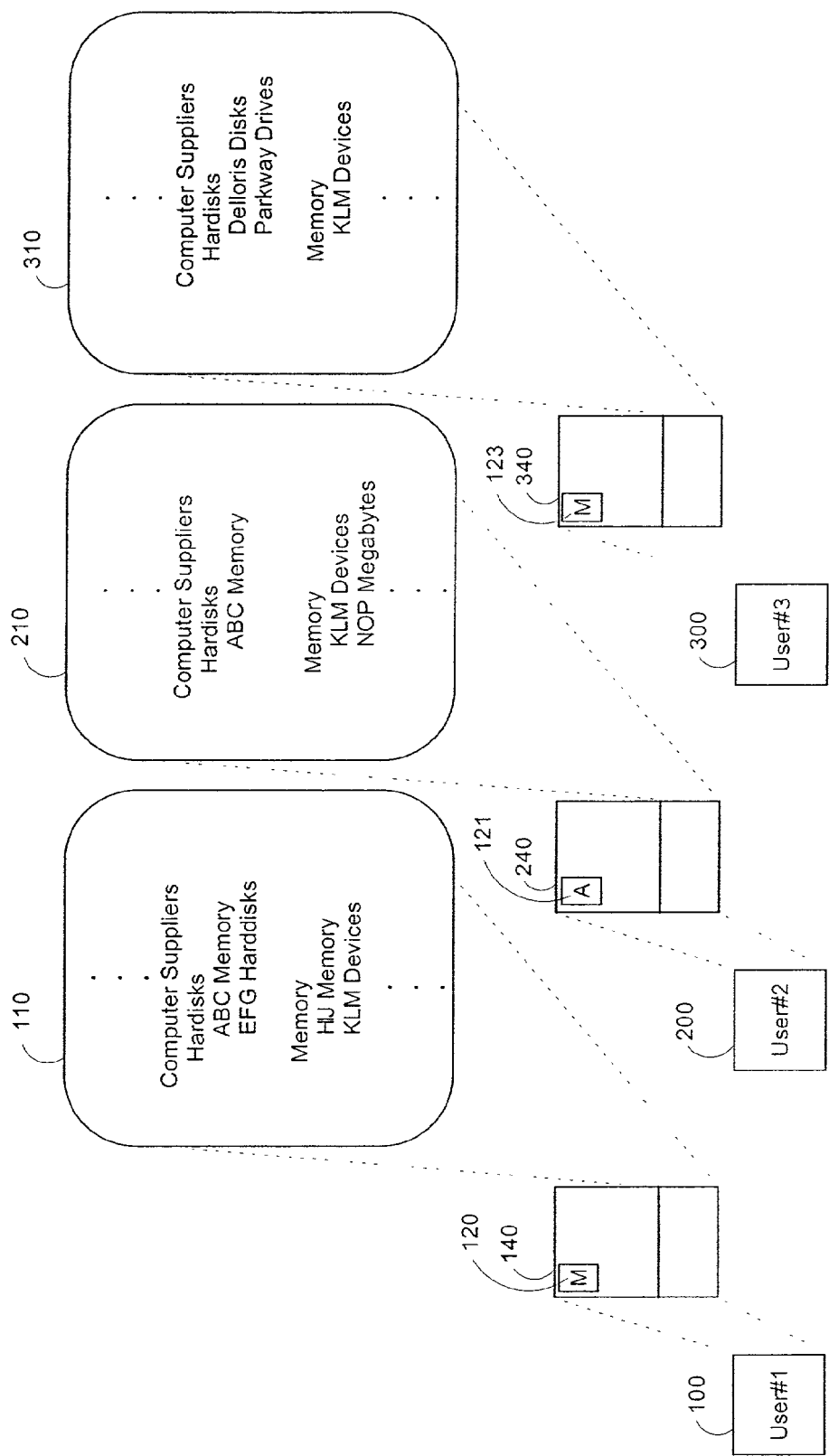
FIG. 2 illustrates an exemplary modification of a contact list in a chat session in accordance with the inventive arrangements of FIG. 1.

FIG. 2 illustrates an exemplary modification of contact list in accordance with the inventive arrangements of FIG. 1. Referring to FIG. 2 contact lists 110, 210 and 310 are associated with chat session participants 100, 200, and 300 having aliases user#1, user#2 and user#3 respectively. For illustrative purposes, the chat session participants all have their own computer businesses and intend to share information regarding product distributors/suppliers. There are no restrictions on accessibility for contact list 110, 210 and 310. Furthermore, contact list 110 and 310 are identified as being modifiable by the presentation of an "M" for icons 120 and 123. Contact list 210 is accessible but it is not modifiable by any of the participants.

When chat session participant 300 compares the associated contact list 310 to contact list 110 and 210, ABC Memory and EFG Harddisks records can be highlighted since they are not contained in contact list 310. Chat session participant 300 can subsequently add ABC Memory and EFG Harddisks to contact list 310. The comparison will also show that Deloris Disks and Parkway Drives records are not on contact lists 110 and 210. Since contact list 110 is modifiable by chat session participant 300, chat session participant 300 can add the Deloris Disks and Parkway Drives records to contact list 110. Chat session participant 300 must request permission from chat session participant 200 in order to modify contact list 210 since the icon indicates and "A" and not "M." If chat session participant 300 is given permission to modify contact list 210 and the modification is made, chat session participant 200 can have the option of accepting or rejecting the modification. If the modification is rejected by chat session participant 200, then the modification made by chat session participant 300 will have no effect on contact list 210. If the modification made by chat session participant 300 is accepted by chat session participant 200, then the addition of the Deloris Disks and Parkway Drives records to contact list 210 will become permanent. On further comparison, chat session participant 300 will recognize that NOP Megabytes from contact list 210 and HIJ Memory from contact list 110 is not in contact list 310. Chat session participant 300 can subsequently add HIJ Memory and NOP Megabytes to contact list 310.

An alternative embodiment to the invention can include a method for providing contact management to parties engaged in a chat communication session. In this embodiment, each participant to the communication session can have an associated contact list. Hence, a first participant to the communication session can have a first contact list and a second participant to the communication list can have a second contact list. Access to a first contact list can be provided to a second participant to the communication session. Similar and/or dissimilar contacts that exist between contact records located in the first contact list and contact records located in the second contact list can be identified. The second chat session participant can be permitted to add selected dissimilar contact records located in the first contact list to the second contact list. If the second chat session participant wants to modify the first contact list, a determination can be made as to whether the first contact list can be modified by the second chat session participant to the communication session. If the first contact list is modifiable by the second participant, selected dissimilar contact records can be added to the first contact list.

To provide access to a particular contact list, an accessibility status of the first contact list can be determined. If the accessibility status indicates that the contact list is accessible, the second participant is permitted to access the first contact list. Likewise, a determination can be made as to whether the second contact list is accessible by the first chat session participant. If the accessibility status indicates that the second contact list is accessible by the first chat session participant, the first chat session participant is permitted to access the second contact list. Upon access, similar contacts that exist between contact records located in the second contact list and contact records located in the first contact list can be identified. If the second contact list is modifiable by the first participant to the communication session, selected dissimilar contact records located in the second contact list can be added to the first contact list.

An icon can be displayed to represent whether a contact list for a participant to the communication session is accessible. While a particular contact list is accessible, it might not be viewable. If the contact list is also modifiable, then the display icon used to represent the accessibility can be modified to indicate that the contact list is also modifiable. For example, and icon with the letter "A" can be used to represent accessibility. The "A" can be modified to "M" which can be used to represent that the contact list is modifiable.

A further embodiment of the invention can include a method for providing contact management to chat session participants. A first chat session participant can have a first associated contact list and a second chat session participant has a second associated contact list. The first chat session participant can be permitted to access the second contact list. Similarly, the second chat session participant can be permitted to access the first contact list. A modification status can be provided to indicate whether the first contact list is modifiable. If the modification status indicates that the first contact list is modifiable, then the addition of contact information to the first contact list is permitted. Similarly, a modification status can be provided to indicate whether the second contact list is modifiable. If the modification status indicates that the second contact list is modifiable, then the addition of contact information to the second contact list is permitted. The modification status of the first and the second contact lists can be provided to selected chat session participants or to all chat session participants.

In a further embodiment of the invention, a system for contact management is provided. The system can include a first contact list, a second contact list and a computing application program. The first contact list can be associated with a first chat session participant, while the second contact list can be associated with a second chat session participant. The computing application program can facilitate the chat session that can occur between chat session participants including the first and the second chat session participants. The computing application program can be a chat application program. Chat application programs are known in the art and can include but are not limited to, dedicated chat software, client/server applications and applets. The computing application program can be hosted on a server or run on an computer. Referring to FIG. 1, there is shown a chat server 105 that can host a chat application program. The application program can permit the second chat session participant to modify the first contact list and can also permit the first chat session participant to modify the second contact list.

The system can further include a computer application server for executing the computing application program. Here, the computer application server can act as a host for hosting the execution of the computing application program. A first computing device can permit the first contact list to be viewed by the second chat session participant and a second computing device can permit the second contact list to be viewed by the first chat session participant. The computing devices can include, but are not limited to, computers, laptops, handheld computing devices such as PDA's and handheld computers.

In a further embodiment of the invention, a GUI for providing contact management for chat session participants is provided. The GUI can include a chat display window for displaying communication for the chat session participants including a first chat session participant and a second chat session participant engaged in a chat session. The chat display can be a secondary window that can be used for displaying communication text and/or controls. The chat display window can also display images of the participants and the controls can control, for example, any audio information that can be communicated among the parties.

At least one contact window can be provided for displaying contact information for at least one chat session participant engaged in the chat session. The GUI can have at least one contact window which can appear as window pane within the chat display window. For example, referring to FIG. 1, user#3 has two contact list windows, 310 and 210 located within chat window 340. Alternately, the GUI can have at least one contact window that can be a window pane located external to the chat display window. For example, referring to FIG. 1, user#3 has one contact list windows 110 located external to chat window 340. The contact windows can be configured so that they can be moved. For example, contact list window 110 can be moved into the chat window 340. A first modifiable status icon can be utilized for indicating whether the first contact list is accessible and, if the first contact list is accessible, whether the first contact list is modifiable. A second status icon can indicate whether the second contact list is accessible and, if the second contact list is accessible, whether the second contact list is modifiable. The icons can be located next to the corresponding communication text in a chat window. This can permit participants to see the current status of another participant's contact list, since a chat session participant can choose to change the accessibility and modification status of their associated contact list at any time.

In view of the foregoing, the invention permits participants to a communication session to determine common contacts that exist between the participants. Dependent on the accessibility of a particular participant's contact list, other participants to the communication session can view the information located in the particular participant's contact list and copy contact information records for their benefit. Additionally, participants may even be privileged to add contact information records to the particular participant's contact list.

In a further aspect of the invention, a token of introduction can be utilized for facilitating the exchange of contact list information. The token of introduction is analogous to an electronic letter of recommendation which can be given from one chat session participant to another. The token of introduction can be an electronic message that, at a minimum, identifies a chat session participant that is to be recommended and the chat session participant making the recommendation. Additional information can include, but is not limited to, data such as personal preferences.

The token of introduction can be originated by a first participant and can introduce a second participant to other participants that are known to the first participant. For illustrative purposes, a token of introduction can be originated by user#1 and can introduce user#2 to parties who are familiar with user#1. Whenever a party, for example user#3, who is known to user#1 initiates a communication with user#2, the token can automatically be transferred to user#3. Upon receipt of the token, user#3 can choose to accept or reject the token. Upon acceptance of the token, user#3 can be given the option of converting the token to a contact list. If user#3 chooses to convert the token to a contact list entry, then the contact information for user #2 can be placed in user#3's contact list. Otherwise, the token could be viewed and discarded. The contact list information for user#3 can also be placed in the contact list of user#2. The token of introduction originated by user#1 can be set to expire after a certain period of time has elapsed. The transfer of the token originated by user#1 can be transparent to the party being recommended, namely, user#2.

In operation, a GUI can be utilized for creating the token of introduction. The GUI can have a fields such as, sender, receiver, and note. The sender field can be automatically filled with the identity of the recommending chat session participant who creating the token of introduction. The sender field can be filled in with information such as the identity of the chat session participant to whom the information is being sent. The note field can contain general information such as preferences of the chat session participant who is being recommended. A send icon on the GUI can be used to send the token. The token can remain in the system until it expires or upon the party to whom the token was sent initiating a chat session with the recommended party. Alternatively, the token can be dispatched to the party to whom it was sent immediately upon selecting the send icon in the GUI. If the participant to whom it was sent is not currently online, then the message is sent once the participant comes back online.

Upon receipt of the token, the chat session participant receiving the token can accept or decline the token. If the token is accepted, then the receiving chat session participant can add the recommended chat session participant's contact information to their contact list. If the recommended party has a contact list that is modifiable, then the receiving chat session participant can add their contact list information to the recommended chat session participant's contact list.

In light of the forgoing, the present invention can be realized in hardware, software, or a combination of hardware and software. A method and system for providing contact management for Internet and Intranet chat rooms according to the present invention can be realized in a centralized fashion in one computer system, or in a distributed fashion where different elements are spread across several interconnected computer systems. Any kind of computer system, or other apparatus adapted for carrying out the methods described herein, is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which when loaded in a computer system, is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A method for sharing contact list information between participants of a chat session, comprising:
   identifying a first chat session participant maintaining a first contact list containing contact information relating to contacts of said first chat session participant and identifying a second chat participant having a second contact list containing contact information relating to contacts of said second chat participant, said first chat session participant and said second chat session participant participating within a common chat session;
   providing the second chat session participant with access to contact information contained within the first contact list;
   selecting the first contact list;
   selecting the second contact list;
   comparing said first contact list and said second contact list;
   identifying common and non-common contacts between said first contact list and said second contact list;
   displaying common contacts in a first visual list and non-common contacts in a second visual list;
   determining whether said first contact list is modifiable by said second chat session participant and modifying said first contact list by said second chat session participant to include non-common contacts if said first contact list is modifiable by said second chat session participant, wherein modifying comprises the step of adding non-common contact information to said first contact list, the contact information pertaining to parties other than the first and second chat session participants; and
   providing the first chat session participant with access to contact information contained within said second contact list.

2. The method according to claim 1, further comprising the step of displaying an icon within a chat session interface used by the second chat session participant to indicate whether said first contact list is accessible to said second chat session participant.

3. The method according to claim 2, wherein said displayed icon indicates whether said first contact list is modifiable.

4. The method according to claim 3, further comprising the step of displaying an icon within a chat session interface used by the first chat session participant to indicate whether said second contact list is accessible to said first chat session participant.

5. The method according to claim 4, wherein said displayed icon of claim 4 indicates whether said second contact list is modifiable.

6. The method according to claim 1, further comprising the steps of:
   identifying a third chat session participant maintaining a third contact list containing contact information relating to contacts of said third chat session participant, said third chat session participant participating within said common chat session; and
   providing the third chat session participant with access to contact information contained within the first contact list and the second contact list and providing the first chat session participant and said second chat session participant with access to contact information contained within the third contact list.

7. The method according to claim 4, further comprising the steps of:
permitting the selection of said displayed icon for said first contact list and said displayed icon for said second contact list;
comparing said selected first contact list and said selected second contact list to said third contact list; and
displaying to said third chat session participant contacts that are common to said first selected contact list, said second selected contact list, and said third contact list according to results from said comparing step.

8. The method according to claim 7, further comprising the steps of:
permitting any of said first chat session participant, said second chat session participant and said third chat session participant to modify any of said first contact list, said second contact list and said third contact list according to results from said comparing step; and
permitting any of said chat session participants associated with said contact list to reject said modification.

9. The method according to claim 5, wherein if said display icon indicates that said first contact list is not modifiable, further comprising the step of requesting said first chat session participant to allow said second chat session participant to modify said contact list.

10. The method according to claim 9, wherein if said display icon indicates that said second contact list is not modifiable, further comprising the step of requesting said second chat session participant to allow said first chat session participant to modify said contact list.

11. The method according to claim 1, further comprising the steps of:
requesting said first chat session participant to provide access to said first contact list; and
requesting said second chat session participant to provide access to said second contact list.

12. The method according to claim 1, further comprising the step of providing accessibility status to selected chat session participants.

13. The method according to claim 1, further comprising the step of providing accessibility status to all active chat session participants.

14. A method for providing contact management to parties engaged in a chat communication session, the method comprising:
identifying a first chat session participant selecting a first contact list containing contact records relating to contacts of said first chat session participant and identifying a second chat participant having a second contact list selected by said first chat session participant containing contact records relating to contacts of said second chat participant, said first chat session participant and said second chat session participant participating within a common chat session;
providing access for said first contact list to a second participant to the communication session;
comparing said first contact list and second contact list;
identifying similar contacts between contact records located in said first contact list and contact records located in said second contact list;
presenting similar contacts in a pre-selected visual format and dissimilar contacts in a different visual format; and
adding selected dissimilar contact records located in said first contact list to said second contact list.

15. The method according to claim 14, further comprising the steps of:
determining if said first contact list is modifiable by said second participant to the communication session; and
if said first contact list is modifiable by said second participant, adding selected dissimilar contact records to said first contact list.

16. The method according to claim 15, wherein said step of providing access to said first contact list further comprises the steps of:
determining an accessibility status of said first contact list; and
providing access to said first contact list if said accessibility status indicates that said second participant can access said first contact list.

17. The method according to claim 14, further comprising the steps of:
determining if said second contact list is accessible by said first participant to the communication session; and
if said second contact list is accessible by said first participant, identifying similar contacts between contact records located in said second contact list and contact records located in said first contact list.

18. The method according to claim 17, further comprising the steps of:
determining if said second contact list is modifiable by said first participant to the communication session; and
adding selected dissimilar contact records located in said second contact list to said first contact list.

19. The method according to claim 14, further comprising the step of displaying an icon to represent whether a contact list for a participant to the communication session is accessible.

20. The method according to claim 19, further comprising the step of modifying said icon to display whether said contact list for said participant to the communication session is modifiable.

21. In a chat session having a plurality of communicating chat session participants, a contact management method comprising:
identifying a plurality of chat session participants participating within a common chat session, each chat session participant maintaining a participant specific contact list containing contact records relating to contacts of said that participant;
assembling and displaying a contact list in a GUI associated with one of the chat session participants, wherein said contact list includes contact records from chat session lists maintained by chat session participants other then the one participant in which the GUI is displayed, and presenting contact records similar among the chat session lists in a pre-selected visual format and dissimilar records in a different visual format, the similarity and dissimilarity based on a comparison of the chat session lists;
selecting a first contact list;
selecting a second contact list;
comparing said first contact list and said second contact list;
identifying common and non-common contacts between said first contact list and said second contact list;
accepting modifications to said contact list by chat session participants other then the one participant in which the GUI is displayed; and
responsively displaying results from said modifications within said GUI.

22. A method for providing contact management in a chat session, comprising:
- identifying a first chat session participant maintaining a first contact list containing contact records relating to contacts of said first chat session participant, identifying a second chat participant having a second contact list containing contact records relating to contacts of said second chat participant, and identifying a third chat participant having a third contact list containing contact records relating to contacts of said third chat participant, said first chat session participant, said second chat session participant, and said third chat session participant participating within a common chat session;
- sending a token of introduction originated by the first chat session participant to the second chat session participant, said token of introduction providing a recommendation for said second chat session participant;
- transferring said token of introduction to the third chat session participant who is known to said first chat session participant;
- if said third chat session participant accepts said token of introduction, modifying said third contact list with contact information for said second chat session participant;
- comparing said first contact list, said second contact list, and said third contact list;
- identifying common and non-common contacts between said first contact list, said second contact list, and said third contact list; and
- displaying common contacts in a first visual list and non-common contacts in a second visual list.

23. The method according to claim 22, further comprising modifying said second contact list with information for said third chat session participant.

24. The method according to claim 23, further comprising discarding said token of introduction upon expiration of a specified period of time.

25. The method according to claim 22, further comprising executing said transferring step upon said third chat session participant initiating a chat session with said second chat session participant.

26. A system for providing contact management, comprising:
- a first contact list, said first contact list containing contact information relating to contacts of and maintained by a first chat session participant;
- a second contact list, said second contact list containing contact information relating to contacts of and maintained by a second chat session participant, said second chat session participant engaged in a chat session with said first chat session participant; and
- a computing application program facilitating said chat session, said application program permitting said second chat session participant to modify contact information contained within said first contact list and permitting said first chat session participant to modify contact information contained within said second contact list by
- comparing said first contact list and said second contact list;
- identifying common and non-common contacts between said first contact list and the second contact list; and
- displaying common contacts in a first visual list and non-common contacts in a second visual list.

27. The system according to claim 26, further comprising a computer application server for executing said computing application program.

28. The system according to claim 26, further comprising a first computing device for permitting said first contact list to be viewed by said second chat session participant and a second computing device permitting said second contact list to be viewed by said first chat session participant.

29. A machine readable storage having stored thereon, a computer program having a plurality of code sections, said code sections executable by a machine for causing the machine to perform the steps of:
- identifying a first chat session participant maintaining a first contact list containing contact information relating to contacts of said first chat session participant and identifying a second chat participant having a second contact list containing contact information relating to contacts of said second chat participant, said first chat session participant and said second chat session participant participating within a common chat session;
- providing the second chat session participant with access to contact information contained within the first contact list;
- selecting the first contact list;
- selecting the second contact list;
- comparing said first contact list and said second contact list;
- identifying common and non-common contacts between said first contact list and said second contact list;
- displaying common contacts in a first visual list and non-common contacts in a second visual list;
- determining whether said first contact list is modifiable by said second chat session participant and modifying said first contact list by said second chat session participant to include non-common contacts if said first contact list is modifiable by said second chat session participant, wherein modifying comprises the step of adding non-common contact information to said first contact list, the contact information pertaining to parties other than the first and second chat session participants; and
- providing the first chat session participant with access to contact information contained within said second contact list.

30. The machine readable storage according to claim 29, further comprising the step of displaying an icon within a chat session interface used by the second chat session participant to indicate whether said first contact list is accessible to said second chat session participant.

31. The machine readable storage according to claim 30, wherein said displayed icon indicates whether said first contact list is modifiable.

32. The machine readable storage according to claim 31, further comprising the step of displaying an icon within a chat session interface used by the first chat session participant to indicate whether said second contact list is accessible to said first chat session participant.

33. The machine readable storage according to claim 32, wherein said displayed icon of claim 6 indicates whether said second contact list is modifiable.

34. The machine readable storage according to claim 33, further comprising the steps of:
- identifying a third chat session participant maintaining a third contact list containing contact information relating to contacts of said third chat session participant, said third chat session participant participating within said common chat session; and providing the third chat session participant with access to contact information contained within the first contact list and the second contact list and providing the first chat session participant and said second chat session participant with access to contact information contained within the third contact list; and displaying icons within a chat session interface used by a third chat session participant to indicate whether said first chat contact list and said second contact list is accessible to said third chat session participant.

35. The machine readable storage according to claim 34, further comprising the step of:

permitting the selection of said displayed icon for said first contact list and said displayed icon for said second contact list;

comparing said selected first contact list and said selected second contact list to said third contact list; and displaying to said third chat session participant contacts that are common to said first selected contact list, said second selected contact list, and said third contact list according to results from said comparing step.

36. The machine readable storage according to claim 35, further comprising the steps of:

permitting any of said first chat session participant, said second chat session participant and said third chat session participant to modify any of said first contact list, said second contact list and said third contact list according to results from said comparing step; and permitting any of said chat session participants associated with said contact list to reject said modification.

37. The machine readable storage according to claim 33, wherein if said display icon indicates that said first contact list is not modifiable, further comprising the step of requesting said first chat session participant to allow said second chat session participant to modify said contact list.

38. The machine readable storage according to claim 33, wherein if said display icon indicates that said second contact list is not modifiable, further comprising the step of requesting said second chat session participant to allow said first chat session participant to modify said contact list.

39. The machine readable storage according to claim 29, further comprising the steps of:

requesting said first chat session participant to provide access to said first contact list; and requesting said second chat session participant to provide access to said second contact list.

40. The machine readable storage according to claim 29, further comprising the step of providing accessibility status to selected chat session participants.

41. The machine readable storage according to claim 29, further comprising the step of providing accessibility status to all active chat session participants.

42. A machine readable storage having stored thereon, a computer program having a plurality of code sections, said code sections executable by a machine for causing the machine to perform the steps of:

identifying a first chat session participant selecting a first contact list containing contact records relating to contacts of said first chat session participant and identifying a second chat participant having a second contact list selected by first chat session participant containing contact records relating to contacts of said second chat participant, said first chat session participant and said second chat session participant participating within a common chat session;

providing access for said first contact list to a second participant to the communication session;

comparing said first contact list and second contact list;

identifying similar contacts between contact records located in said first contact list and contact records located in said second contact list;

presenting similar contacts in a pre-selected visual format and dissimilar contacts in a different visual format; and adding selected dissimilar contact records located in said first contact list to said second contact list.

43. The machine readable storage according to claim 42, further comprising the steps of:

determining if said first contact list is modifiable by said second participant to the communication session; and if said first contact list is modifiable by said second participant, adding selected dissimilar contact records to said first contact list.

44. The machine readable storage according to claim 43, wherein said step of providing contact list to a first participant further comprises the steps of:

determining an accessibility status of said first contact list; and providing access to said first contact list if said accessibility status indicates that said second participant can access said first contact list.

45. The machine readable storage according to claim 42, further comprising the steps of:

determining if said second contact list is accessible by said first participant to the communication session; and if said second contact list is accessible by said first participant, identifying similar contacts between contact records located in said second contact list and contact records located in said first contact list.

46. The machine readable storage according to claim 45, further comprising the steps of:

determining if said second contact list is modifiable by said first participant to the communication session; and adding selected dissimilar contact records located in said second contact list to said first contact list.

47. The machine readable storage according to claim 46, further comprising the step of displaying an icon to represent whether a contact list for a participant to the communication session is accessible.

48. The machine readable storage according to claim 47, further comprising the step of modifying said icon to display whether said contact list for said participant to the communication session is modifiable.

49. A machine readable storage having stored thereon, a computer program having a plurality of code sections, said code sections executable by a machine for causing the machine to perform the steps of:

identifying a plurality of chat session participants participating within a common chat session, each chat session participant maintaining a participant specific contact list containing contact records relating to contacts of said that participant;

assembling and displaying a contact list in a GUI associated with one of the chat session participants, wherein said contact list includes contact records from chat session lists maintained chat session participants other then the one participant in which the GUI is displayed;

selecting a first contact list;

selecting a second contact list;

comparing said first contact list and said second contact list;

identifying common and non-common contacts between said first contact list and the second contact list;

displaying common contacts in a first visual list and non-common contacts in a second visual list; and accepting modifications to said contact list by chat session participants other then the one participant in which the GUI is displayed and responsively displaying results from said modifications within said GUI.

50. A machine readable storage having stored thereon, a computer program having a plurality of code sections, said code sections executable by a machine for causing the machine to perform the steps of:

identifying a first chat session participant maintaining a first contact list containing contact records relating to contacts of said first chat session participant, identifying a second chat participant having a second contact list containing contact records relating to contacts of said second chat participant, and identifying a third chat participant having a third contact list containing contact records relating to contacts of said third chat participant, said first chat session participant, said second chat session participant, and said third chat session participant participating within a common chat session;

sending a token of introduction originated by the first chat session participant to the second chat session participant, said token of introduction providing a recommendation for said second chat session participant;

transferring said token of introduction to the third chat session participant who is known to said first chat session participant;

if said third chat session participant accepts said token of introduction, modifying said third contact list with contact information for said second chat session participant;

comparing said first contact list, said second contact list, and said third contact list;

identifying common and non-common contacts between said first contact list, said second contact list, and said third contact list; and displaying common contacts in a first visual list and non-common contacts in a second visual list.

51. The machine readable storage according to claim 50, further comprising modifying said second contact list with information for said third chat session participant.

52. The machine readable storage according to claim 51, further comprising discarding said token of introduction upon expiration of a specified period of time.

53. The machine readable storage according to claim 50, further comprising executing said transferring step upon said third chat session participant initiating a chat session with said second chat session participant.

54. The method according to claim 50, further comprising the step of:

displaying icons within a chat session interface used by a third chat session participant to indicate whether said first chat contact list and said second contact list is accessible to said third chat session participant.

55. The method according to claim 54, further comprising the steps of:

permitting the selection of said displayed icon for said first contact list and said displayed icon for said second contact list;

comparing said selected first contact list and said selected second contact list to said third contact list; and displaying to said third chat session participant contacts that are uncommon to said selected first contact list, said selected second contact list and said third contact list according to results from said comparing step.

* * * * *